United States Patent
Bosnar

(10) Patent No.: US 6,710,599 B2
(45) Date of Patent: Mar. 23, 2004

(54) APPARATUS FOR MEASURING TERRAIN CONDUCTIVITY

(75) Inventor: Miroslav Bosnar, Toronto (CA)

(73) Assignee: Geonics Limited, Mississauga (CA)

( * ) Notice: Subject to any disclaimer, the term of this patent is extended or adjusted under 35 U.S.C. 154(b) by 34 days.

(21) Appl. No.: 10/114,235

(22) Filed: Apr. 2, 2002

(65) Prior Publication Data

US 2003/0184301 A1 Oct. 2, 2003

(51) Int. Cl.[7] .................................................. G01V 3/10
(52) U.S. Cl. ........................................ 324/334; 324/225
(58) Field of Search ................................ 324/334, 225, 324/239, 329, 336, 337; 702/104

(56) References Cited

U.S. PATENT DOCUMENTS

| | | |
|---|---|---|
| 4,070,612 A | 1/1978 | McNeill et al. |
| 4,199,720 A | 4/1980 | McNeill |
| 4,682,113 A * | 7/1987 | Barben, II .................. 324/441 |

OTHER PUBLICATIONS

McNeill, J.D., Electromagnetic Terrain Conductivity Measurement At Low Induction Numbers, Oct. 1980.

* cited by examiner

Primary Examiner—Walter E. Snow
(74) Attorney, Agent, or Firm—Hodgson Russ LLP

(57) ABSTRACT

A conductivity meter for measuring conductivity of terrain, including a first transmitter coil, a signal generator connected to the first transmitter coil to supply a time-varying current thereto for inducing eddy currents in the terrain, a first receiver coil horizontally spaced from the first transmitter coil, a temperature sensing device for measuring temperature, and a signal processor, including a memory storing a plurality of temperature dependent correction values, for isolating from a signal received by the first receiver coil a secondary signal representative of a secondary magnetic field generated in the terrain by the eddy currents, and determining an apparent terrain conductivity based on the isolated secondary signal and a selected temperature dependent correction value selected from the stored temperature dependent correction values according to a measured temperature received from the temperature sensing device.

23 Claims, 7 Drawing Sheets

APPARATUS FOR MEASURING TERRAIN CONDUCTIVITY

BACKGROUND OF INVENTION

This invention relates to an instrument for measuring terrain conductivity.

It is well known that terrain conductivity measurements provide useful information for purposes of geological mapping, and techniques have been developed for that purpose that employ non-ground contacting electromagnetic devices that are either airborne or for use on the ground. An example of a widely used electromagnetic device for measuring ground conductivity is disclosed in U.S. Pat. No. 4,070,612 issued Jan. 24, 1978, to McNeill et al. and assigned to the assignee of the present invention.

With reference to FIG. 1, a commonly used technique for measuring ground conductivity involves energizing a transmitting coil Tx that is located on or just above the surface of the earth with an alternating current at an audio frequency into a transmitting coil Tx. The time varying magnetic field from this alternating current induces very small eddy currents in the earth, which in turn generate a secondary magnetic field that is sensed by a receiver coil Rx that is located a short distance s away from the transmitting coil Tx. In general, the secondary magnetic field is a complicated function of the intercoil spacing s, the operating frequency f, and the ground conductivity σ, with the ratio of secondary to primary magnetic field represented by:

$$\frac{Hs}{Hp} = \frac{2}{(\gamma s)^2}\{9 - [9 + 9\gamma s + 4(\gamma s)^2 + (\gamma s)^3]e^{-\gamma s}\}, \quad \text{(Equ. 1)}$$

Where:
Hs=secondary magnetic field at the receiver coil
Hp=primary magnetic field at the receiver coil
$\gamma = \sqrt{i\omega\mu_0\sigma}$
$\omega 2\Pi f$
f=frequency
$\mu_0$=permeability of free space
σ=ground conductivity (Siemen/meter)
s=intercoil spacing (meter)
$i = \sqrt{-1}$ As explained in J. D. McNeill, "Geonics Limited Technical Note TN-6—Electronic Terrain Conductivity Measurement at Low Induction Numbers", Geonics Limited, 1980, under certain constraints the ratio of secondary to primary magnetic fields is a relatively simple function of the above variables, namely:

$$\frac{Hs}{Hp} \cong \frac{i\omega\mu_0 \sigma s^2}{4}, \quad \text{(Equ. 2)}$$

Given the ratio of secondary to primary magnetic fields, the apparent conductivity $\sigma_a$ can be calculated as:

$$\sigma_a = \frac{4}{\omega\mu_0 s^2}\left(\frac{Hs}{Hp}\right), \quad \text{(Equ. 3)}$$

The linear relationship between the ratio of secondary to primary magnetic fields and the conductivity of the terrain being surveyed is typically maintained as long as the coil separation is less than about one tenth of skin depth. In most practical cases, the secondary magnetic field Hs is a very small fraction of the primary magnetic field Hp. For example, with a coil separation of s=2 m, frequency of operation f=20 kHz and ground conductivity of 1 mS/m, the ratio of Hs/Hp=1.58×10$^{-4}$. Since most often secondary magnetic field Hs is measured in the presence of a primary magnetic field Hp that is many of orders of magnitude larger, great care must be taken to maintain stability of the measuring system to accurately measure the secondary magnetic field (and indirectly ground conductivity), especially in areas where terrain conductivity is low.

In order to maintain stability in a cost effective manner in prior ground conductivity measuring systems, the number of coils has typically been limited to one transmitting coil and at most two receiver coils, with instruments having only one receiver coil being more common. As it is sometimes desirable to take multiple measurements of the same terrain location with different coil orientations and/or spacings, the lack of a plural coil pairs in previous EM based conductivity measuring instruments has led to decreased efficiency in performing measurements as the measurement process has to be repeated for each different coil orientation or spacing.

Furthermore, as ambient temperature variation tends to affect the mutual coupling and interaction between the ground and the receiver and transmitter coils, the stability of previous systems has been adversely affected by temperature changes. Attempts have been made to use analog circuitry, including temperature sensitive resistors, in ground conductivity measuring systems to compensate for the effect of temperature changes on such systems. An example of an EM measuring device that employs an analog temperature compensation system is the Geonics EM31 (trademark), that is available from Geonics Limited of Mississauga, Ontario, Canada. Although useful in many applications, analog temperature compensation techniques tend to have limited success in correcting for temperature drift that does not vary in a substantially linear fashion with temperature change.

Thus, there is a need for a ground conductivity measuring device that uses multiple transmitters and receivers in a configuration that permits system stability to be maintained, and for a ground conductivity measuring device that operates with stability through a wide range of ambient temperatures.

SUMMARY OF THE INVENTION

According to one aspect of the invention, there is provided a conductivity meter for measuring conductivity of terrain, including a first transmitter coil, a signal generator connected to the first transmitter coil to supply a time-varying current thereto for inducing eddy currents in the terrain, a first receiver coil horizontally spaced from the first transmitter coil, a temperature sensing device for measuring temperature and a signal processor. The signal processor includes a memory storing a plurality of temperature dependent correction values, and is configured to isolate from a signal received by the first receiver coil a secondary signal representative of a secondary magnetic field generated in the terrain by the eddy currents, and determine an apparent terrain conductivity based on the isolated secondary signal and a selected temperature dependent correction value selected from the stored temperature dependent correction values according to a measured temperature received from the temperature sensing device. Preferably, the temperature sensing device includes a sensor positioned to measure the first receiver coil temperature.

According to the invention, there is also provided a method of measuring terrain conductivity that includes: (a)

generating an AC signal and applying it to a transmitter coil positioned over the terrain whose conductivity is being measured; (b) receiving signals from the transmitter coil by means of a receiver coil horizontally spaced from the transmitter coil; (c) isolating from the received signals a signal representative of a secondary magnetic field generated in the terrain by eddy currents resulting from a primary magnetic field generated by the transmitter coil; (d) measuring a temperature of the receiver coil and selecting based thereon a correction value from a plurality of pre-determined temperature dependent correction values; and (e) calculating an apparent conductivity according to the selected correction value and a magnitude of the isolated signal.

According to another aspect of the invention, there is provided a conductivity meter for measuring conductivity of terrain, including a transmitter coil, a signal generator connected to the first transmitter coil to supply a time-varying current thereto for inducing currents in the terrain, a plurality of receiver coils horizontally spaced from the transmitter coil at different distances and a signal processor configured to isolate, for each receiver coil, an associated secondary signal representative of a secondary magnetic field generated in the terrain by the induced currents and received by the receiver coil, and determine, for each isolated secondary signal an apparent conductivity based on the isolated secondary signal.

According to still a further aspect of the invention, there is provided a conductivity meter for measuring conductivity of terrain, including a first transmitter coil and a second transmitter coil located proximate to each other and having perpendicular dipoles, a signal generator connected to the first transmitter coil and the second transmitter coil to supply a time-varying current thereto for generating perpendicular primary magnetic fields inducing currents in the terrain, a first receiver coil coplanar with and horizontally spaced from the first transmitter coil, a second receiver coil coplanar with and horizontally spaced from the second transmitter coil in the same direction and substantially the same distance that the first receiver coil is spaced from the first transmitter coil, the first transmitter and first receiver coils having parallel dipoles and the second transmitter and second receiver coils having parallel dipoles, and a signal processor. The signal processor is configured to isolate, for the first receiver coil, a secondary signal representative of a secondary magnetic field generated in the terrain by the current induced therein by a primary field generated by the first transmitter coil, and to isolate for the second receiver coil, a secondary signal representative of a secondary magnetic field generated in the terrain by the current induced therein by a primary field generated by the second transmitter coil, the signal processor being configured to determine, for each isolated secondary signal an apparent conductivity based on the isolated secondary signal. Preferably, the first transmitter and second transmitter coils are wound in perpendicular plans about a common coil former and the first receiver and second receiver coils are wound in perpendicular plans about a further common coil former.

BRIEF DESCRIPTION OF THE DRAWINGS

Exemplary embodiments of the invention are described further with reference to the accompanying drawings, in which like reference numerals refer to like components throughout.

DESCRIPTION OF THE PREFERRED EMBODIMENTS

Figure 2:
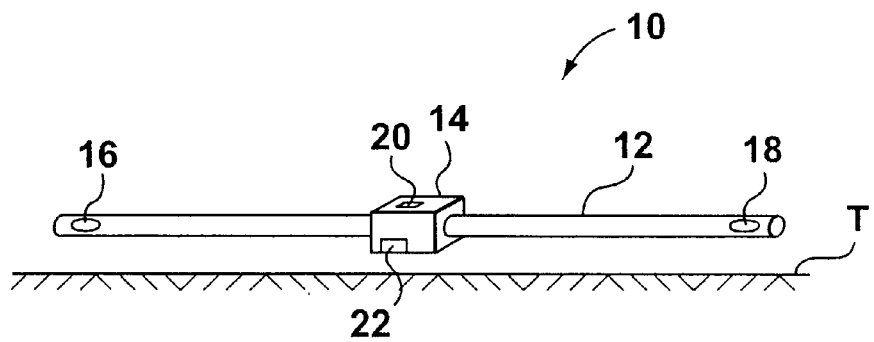
FIG. 2 is a diagrammatic illustration of the mechanical aspects of one preferred form of a terrain conductivity meter according to the present invention.

FIG. 2 shows one form of a terrain conductivity meter, indicated generally by reference 10, of the present invention. The conductivity meter 10 includes a rigid horizontal boom 12 which may be of any strong, rigid, light weight, non-conductive material, for example wood or fibre reinforced synthetic resin. At the centre of the boom is an enclosure 14 which contains electronic components of the apparatus, including a signal generator and a signal processor. A transmitter coil assembly 16 and a receiver coil 18 are mounted in or on opposite ends of the boom 12.

In use, a person operating the meter 10 grasps the boom (or suitable handle grips, not shown) to either side of the enclosure 14 and carries it over terrain T to be surveyed. Conductivity readings may be displayed in real time by a visual output such as a digital display 20, and also recorded in memory within the enclosure 14 for output at a later time through an interface 22. In a typical case, the boom dimensions are such that the axis of the transmitter coil assembly 16 and the receiver coil assembly 18 are separated by 3.7 meters, although instruments having different coil separations (for example between 1 meter and 4 meters) are useful in certain applications.

Figure 3:
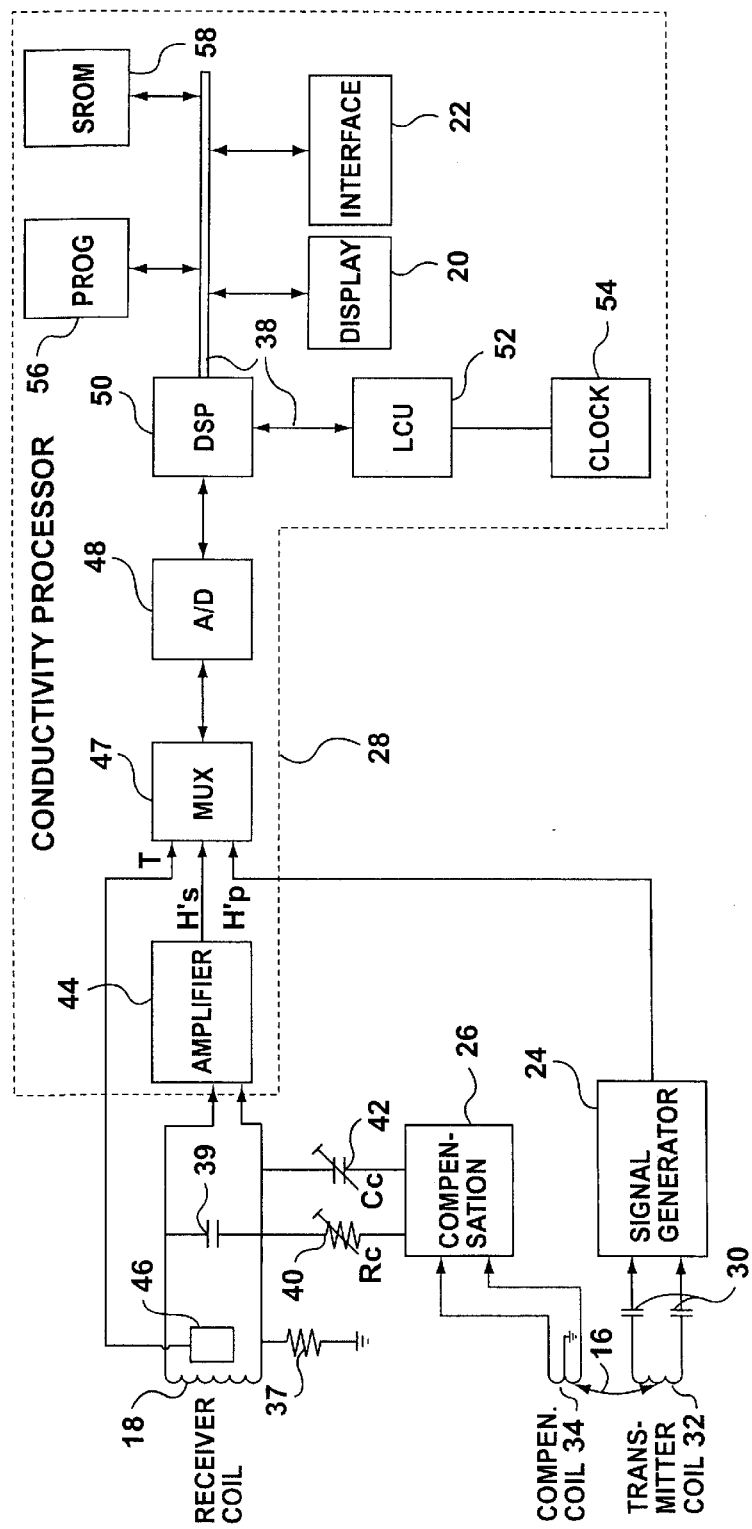
FIG. 3 is a block schematic diagram of the electronic aspects of one preferred form of the terrain conductivity meter.

With reference to FIG. 3, the electronic components housed within the enclosure 14 include a transmitter signal generator 24, and a received signal processor that includes a compensation network 26 and a conductivity processor 28. The signal generator 24 is configured to generate an AC current of a predetermined frequency and amplitude, and thus will typically include an oscillator and appropriate amplification components. The signal generator 24 is coupled through a pair of tuning capacitors 30 to apply the AC current to a transmitter coil 32 of the transmitter coil assembly 16. For reasons now well known to those skilled in the art, and described in above mentioned U.S. Pat. No. 4,070,612, the spacing S in meters between the transmitter coil 32 and the receiver coil 18 and the frequency f of the AC current in Hertz used to energize the transmitter coil will typically be restricted to values such that s does not substantially exceed about $50/\sqrt{fg}$ where g is the maximum terrain conductivity to be measured in Siemens/meter. By way of example, in one embodiment in which the transmitter and receiver coils are spaced apart 3.7 meters, the frequency of the signal generated by the signal generator 24 is 9.8 kHz.

The receiver coil 18, which is coplanar with the transmitter coil 32, picks up a primary signal transmitted by the transmitter coil 32 and a secondary signal set up by currents induced in the terrain by the primary signal. Using techniques known in the art, in order to avoid the secondary signal being swamped by the primary signal, a reference coil 34 also forming part of the transmitter coil assembly 16 and tightly coupled with the transmitter coil 32 is used to supply a component of a cancellation signal applied to the receiver coil 18 through an analog compensation summing network that includes a compensation resistor 37 or by inductive coupling such that the cancellation signal component is applied in antiphase to the primary signal received by the receiver coil 18 directly from the transmitter coil 32. The resistor 37 generates a primary field compensation voltage (Vc) as a result of currents (Ic) applied through a compensation network 26 (Vc=IcR$_{37}$). An optical tuning capacitor 39 can be included in the circuit. The compensation network 26 provides preset adjustment 40 of the in-phase amplitude, and a present adjustment 42 of the quadrature phase of the component applied (ie. the component leading the component that was applied by 90 degrees) so that the compensation network 26 exactly cancels the primary signal received by the receiver coil 18.

The remaining uncancelled signal from the receiver coil 18 is passed through to the conductivity processor 28. As suggested above, in prior terrain conductivity meters, temperature sensitive resistors have been used in the compensation network in an attempt to cancel temperature drift by operating directly on the analog signal output from the receiver coil. In the present invention, the signal from the receiver coil 18 that is applied to the conductivity processor 28 is not temperature compensated until after it has been converted to a digital signal, as will be explained in greater detail below.

In conductivity processor 28, the remaining uncancelled signal from the receiver coil is provided to an amplification network 44, which provides an output signal Hs' that is proportional to the secondary signal, and hence representative of the secondary field Hs. Such output is provided to a multiplexer 47, which also receives input of the receiver coil temperature T from a solid state temperature sensor 46, and receives directly from the signal generator 24 a signal Hp' that is proportional to the primary signal generated by the transmitter coil 32, and hence representative of the primary field Hp. These three signals are multiplexed and provided to an analog to digital converter 48, and the sampled values output from converter 48 provided to a digital signal processor 50. The digital signal processor (DSP) 50 is configured to adjust the signal Hs' to compensate for temperature drift, and then calculate an apparent conductivity $\sigma_a$ In order to perform temperature drift compensation, in a preferred embodiment the conductivity processor 28 includes persistent memory such as SROM 58 that stores a look-up table of temperature adjustment values that have been pre-determined for a range of temperature readings. The DSP 50 is configured to apply, based on the measured receiver coil temperature T, the appropriate pre-determined correction to the sampled signal Hs' to provide a temperature corrected value Hs'(corrected). In some embodiments, the signal Hs' may be further corrected to cancel any component of the secondary signal received by coil 18 that is in phase with the primary signal.

The DSP 50, having access to the values Hs'(corrected) and Hp' that are representative of the secondary and primary fields respectively, is configured to determine the apparent conductivity $\sigma_a$ of the terrain being measured. Such determination is based on Equation 3 noted above (the frequency f of the primary current, the spacing s between the transmitter and receiver coils being known values), with the DSP 50 either being configured to perform the calculation in real time or to access a further look up table in SROM 58 to determine the apparent conductivity based on pre-calculated values. As the primary signal will generally be a constant AC profile, the variable in Equation 3 will typically be the secondary field Hs—thus, the apparent conductivity will be linearly proportional to the temperature adjusted isolated quadrature component Hs'(corrected)—in other words, $\sigma_a$=KHs'(corrected), where K will be constant for a particular signal generator frequency, amplitude and coil spacing.

Preferably, the determined apparent conductivity can be displayed on the digital display 20 so that the operator can visually associate any anomalies in the conductivity to the location at which they occur. Additionally, the determined apparent conductivity can be stored in a writable portion of a program memory 56 for future digital download through interface port 22. New values of apparent conductivity can be calculated and displayed or stored at whatever rate is determined to be practically usable. If desired terrain resistivity, being the reciprocal of conductivity, can be determined and displayed or stored in place of or addition to conductivity.

The conductivity processor 28 of FIG. 3 further includes a logic control unit 52 and clock 54 for providing overall control and timing, respectively of the operation of the remaining components of the conductivity processor 28. The program memory 56 includes a persistent portion that includes the operating instructions used by the components of the conductivity processor 28. A system bus 38 interconnects the digital components of the conductivity processor 28. It will be appreciated that the functionality of conductivity processor 28 could be realized in any number of ways in addition to that shown in FIG. 3. For example, a suitable programmed conventional personal computer or other microprocessor controlled device could be used with an analog to digital convertor and suitable amplifier and multiplexor components to implement the conductivity processor 28.

Figure 4:
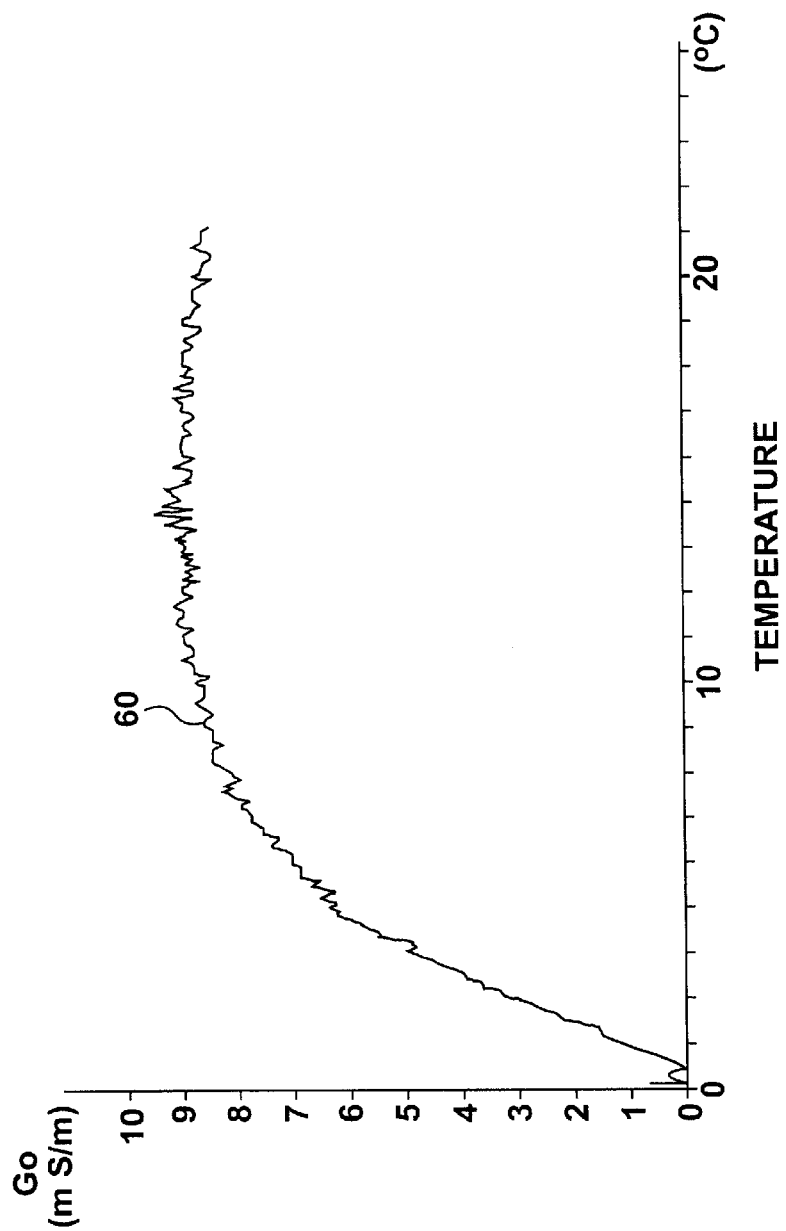
FIG. 4 is a graph showing sample temperature drift profiles used to temperature calibrate a conductivity meter.

The pre-determination of the temperature drift correction values will now be explained in greater detail. In order to derive and pre-store accurate temperature correction values, the conductivity meter 10 is subjected to a calibration procedure in which it is placed in a variable temperature environment and used to measure conductivity of a terrain for which the conductivity is known, over a wide range of receiver coil temperature without performing any temperature correction. The error in measured conductivity is plotted against changes in receiver coil temperature to create a temperature drift profile for the conductivity meter. In this regard, FIG. 4 illustrates a sample plot 60 of error signal versus temperature plots on a graph with error magnitude on the vertical axis and temperature on the horizontal axis. The plot line 60 shows a temperature drift profile in which the error is non-linear with respect to temperature variation, and the plot line 62 shows a temperature drift profile in which the error is approximately proportional to temperature variation. Based on the measured profile, correction values can be calculated for a number of discrete temperature values to effectively compensate for any error introduced to the measured secondary field value Hs', and the correction values stored in SROM 58 for future use. Preferably, during the calibration procedure, the temperature drift profile is measured a number of times and an average taken at each of the desired discrete temperatures from which the appropriate correction values are determined.

The non-linear error versus temperature relationship of FIG. 4 has been difficult to accurately compensate for using temperature sensitive resistors in conventional analog compensation networks, as such resistors tend to be better suited to compensating for a more linear drift relationship. However, the use of pre-determined correction values according to the present invention can compensate for non-linear variations with relative ease. The use of an effective temperature compensation system is especially useful in a conductivity measurement system in which multiple receiver coils are used as discussed in greater detail below.

A standard field procedure when measuring ground conductivity with an EM instrument having a coplanar transmitter and receiver coil (for example, a device using techniques disclosed in U.S. Pat. No. 4,070,612) is to make a measurement with the axes of the coplanar transmitter and receiver coils in the vertical position, and then subsequently make a second measurement with the coil axes in the horizontal position by rotating the instrument 90 degrees until the axes are parallel to the terrain plane. The vertical and horizontal orientations will, in many terrain conditions, each provide a different sensitivity response versus depth of a layer of homogeneous material. Thus, the two apparent conductivity measurements can collectively provide some information of the distribution of ground conductivity with depth.

Figure 5:
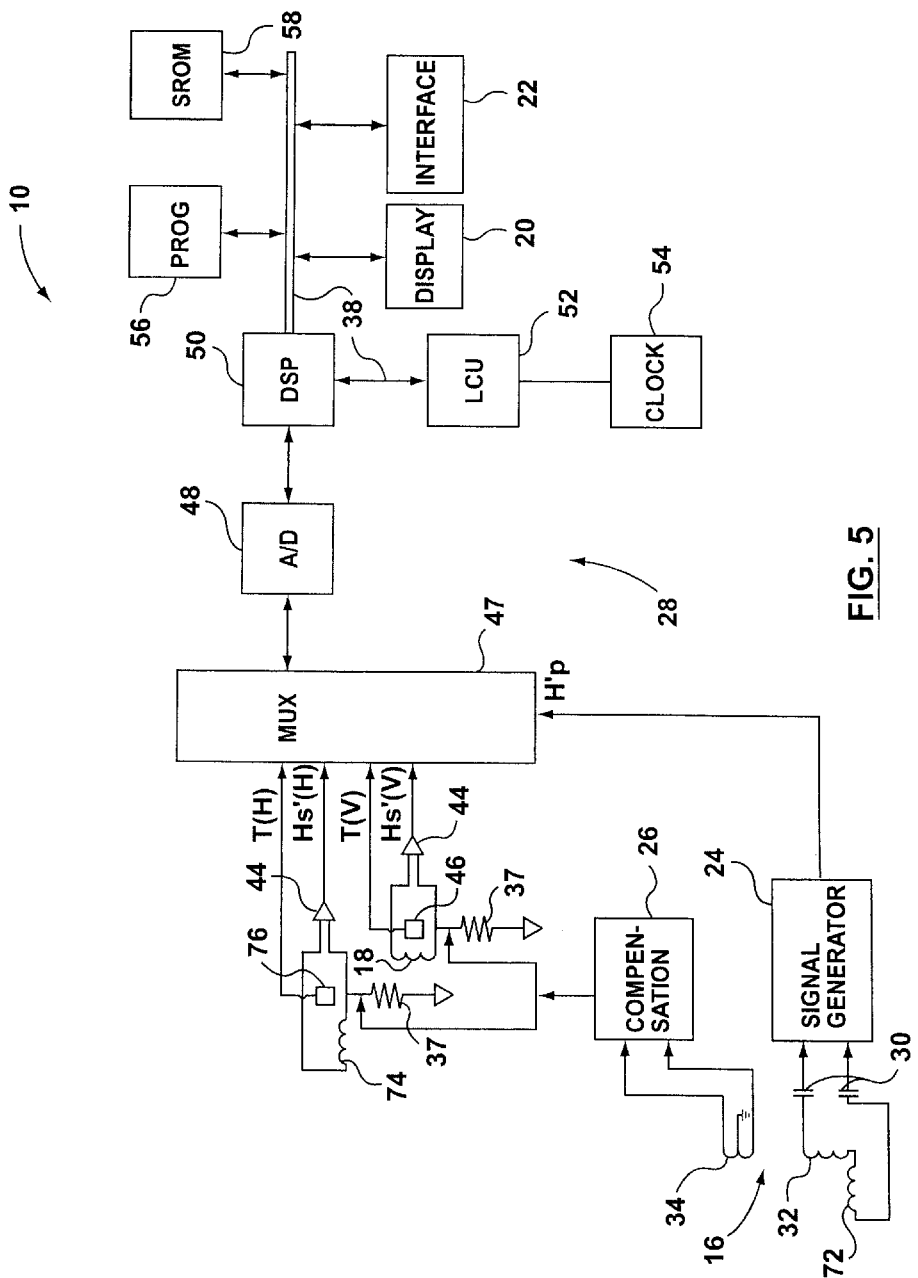
FIG. 5 is a block schematic diagram of the electronic aspects of a further preferred form of the terrain conductivity meter.
Figure 6:
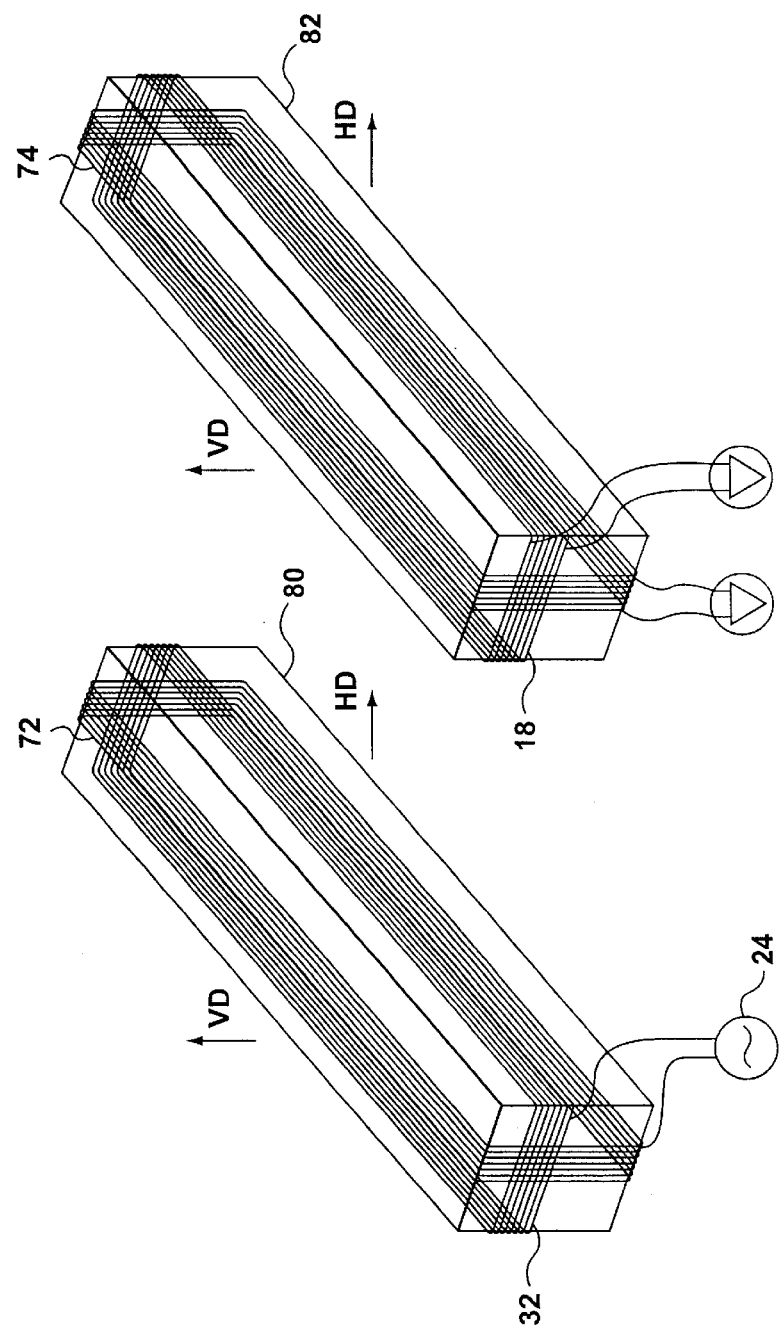
FIGS. 6A and 6B are perspective views of transmitter and receiver coil configurations in a preferred implementation of the terrain conductivity meter of FIG. 5.

In accordance with a further embodiment of the present invention, FIG. 5 shows a block schematic of a further terrain conductivity meter, indicated generally by reference 70, having two pairs of receiver-transmitter coils that operate simultaneously and which are oriented perpendicular to each other so that vertical and horizontal readings can be taken at the same time. The terrain conductivity meter 70 has substantially the same configuration and method of operation as the meter 10 described above, except for the differences noted below. In particular in meter 70, the transmitter coil assembly 16 includes a further transmitter coil 72 arranged perpendicular to the first transmitter coil 32, and on the receiving side, a further receiver coil 74 is arranged perpendicular to the first receiver coil 18. A preferred physical arrangement for the transmitters coils is shown in FIG. 7A, and a preferred physical arrangement for the receiver coils is shown in FIG. 7B. Referring to FIG. 6A, the transmitter coil 32 is arranged such that the axis about which it is wound extends in a vertical direction VD so that it is dipole vertical, and the transmitter coil 72 is arranged such that the axis about which it is wound extends in a horizontal direction HD so that it is dipole horizontal, when the meter 70 is in use. The transmitter coils 32 and 72 are preferably connected in series with the signal generator 24 and are substantially identical (eg. having the same size and number of windings) other than their respective orientations. The compensation coil 34 (not shown in FIG. 7A) is tightly wound with one or the other of the transmitter coils 32 and 37.

Referring to FIG. 6B, the receiver coil 18 is arranged so that the axis about which it is wound is extends vertically so that it is dipole vertical, and the receiver coil 74 is arranged so that the axis about which it is wound extends horizontally so that it is dipole horizontal, when the meter 70 is in use. The receiver coils 18 and 74 are each connected to compensation network 26 and a respective compensation resistor 37 so that the secondary signals picked up by the receiver coils from the terrain can be isolated from the primary signals transmitted directly by the transmitter coils. As the two transmitter coils 32 and 74 are connected in series and are substantially identical, a single compensation coil coupled with one of the transmitter coils can, in conjunction with the compensation network 26, preferably be used to facilitate cancellation of the primary signal induced in both of the receiver coils. The receiver coils are each connected to provide respective output signals (that are representative of the isolated secondary signals received) through respective amplification networks 44 to the multiplexer 47 of the conductivity processor 28. The receiver coils 18 and 74 are preferably substantially identical (eg. having the same size and number of windings) other than their respective orientations.

As shown in FIGS. 6A and 6B, in a preferred embodiment, the transmitter coils 32 and 72 are each wound in two perpendicular plans around a common non-conductive coil former, represented by rectangle 80, and the receiver coils 18 and 74 are each wound in two perpendicular plans around a common non-conductive coil former, represented by rectangle 82. Thus, the first and second transmitter coils 31 and 72 are wound about common coil former 80 having three pairs of opposite sides, with the first transmitter coil wound about two pairs of opposite sides of the coil former and the second transmitter coil wound about two pairs of opposite sides of the coil former, the first and second transmitter coils each passing over a common pair of opposite sides of the coil former. Similarly, the first and second receiver coils 18 and 75 are wound about common coil former 82 having three pairs of opposite sides, with the first receiver coil wound about two pairs of opposite sides of the coil former 82 and the second receiver coil wound about two pairs of opposite sides of the coil former 82, the first and second receiver coils each passing over a common pair of opposite sides of the coil former 82. In such a configuration, the axes of the two transmitter coils intersect at a common electrical center and the axes of the two receiver coils intersect at a common electrical center.

The use of a common coil former 80 for the transmitter coils and a common coil former 82 for the receiver coils, although not essential, provides compact coil assemblies that take up less space than if separate coil formers were used for each of the transmitter and receiver coils.

With reference again to FIG. 5, the meter 70 may include a further temperature sensing device 76 to determine the temperature of the further receiver coil 74 and provide such temperature information to the conductivity processor 28. In embodiments where the receiver coils 18 and 74 are located close to each other, for example, when they are wound about common coil former 82, the use of separate temperature sensing devices 46 and 76 for two perpendicular receiving coils may not be required as a single temperature sensing device may accurately provide temperature information for both coils.

As with the terrain conductivity meter 10, the dual dipole terrain conductivity meter 70 is subjected to a calibration procedure during which the temperature drift profile of each of the receiver coils 18 and 74 is determined such that an error correction value for each of a number of discrete temperature dependent correction values for each receiver coil can be stored in a look up table in SROM 58.

Figure 1:
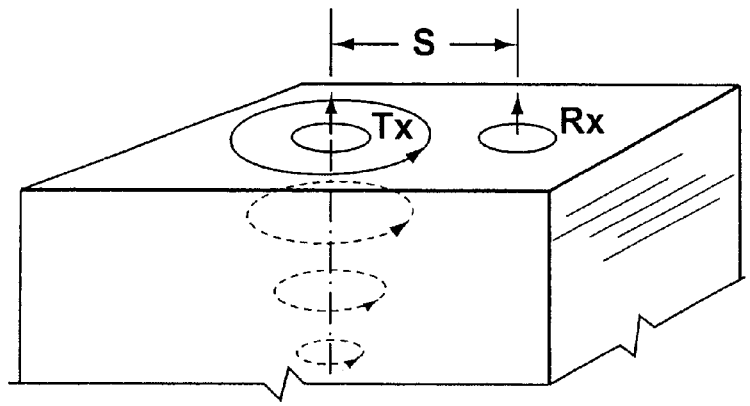
FIG. 1 is a conceptual drawing of a common technique for measuring ground conductivity.

During use, the terrain conductivity meter 70 is positioned over the terrain to be measured with the transmitter coil 32 and corresponding coplanar receiver coil 18 dipoles vertical coplanar, and the further transmitter coil 72 and its corresponding coplanar receiver coil 74 dipoles horizontal coplanar. The signal generator 24 energises both transmitter coils 32 and 72 to induce perpendicular primary signals that induce eddy currents in the terrain resulting in magnetic fields that in turn induce secondary current signals in the receiver coils 18 and 74, respectively. Primary voltages are also induced in the coils 18 and 74 directly by the transmitter coils, however the compensation coil 34 and its corresponding compensation network 26 apply, through resistors 37, a cancellation signal to each of the receiver coils 18 and 74, to effectively cancel the effect of the primary signal on the respective output signals from the receiver coils 18 and 74. Although not shown in FIG. 5, the compensation network 26 includes separate calibration resistor/capacitors 40, 42 (see FIG. 1) associated with the resistor 37 of each receiver coil 18, 76. Interference between the signals generated and received by the vertical dipole coils and the signals generated and received by the horizontal dipole coils is negligible due to the perpendicularity of the signals.

The multiplexer 47 thus receives as inputs: a) signal Hp' from the signal generator 24 that is representative of both the primary field Hp(v) generated by the vertical dipole transmitter coil 32 and the primary field Hp(h) generated by the horizontal dipole transmitter coil 72; b) signal Hs'(v) that is representative of the signal induced by the secondary field Hs(v) received by the vertical dipole receiver coil 18; c) temperature signal T(v) indicating the current temperature of vertical dipole coil 18; d) signal Hs'(h) that is representative of the signal induced by the secondary field Hs(h) received by the horizontal dipole receiver coil 74; and e) temperature signal T(h) indicating the current temperature of horizontal dipole receiver coil 74. Based on such inputs and pre-stored information (including the calibrated temperature correction values for each of the receiver coils), the conductivity processor 28 is able to determine simultaneously (or near simultaneously), using the techniques discussed above, an apparent terrain conductivity as measured by the vertical dipole coplanar transmitter-receiver coil pair, and an apparent terrain conductivity as measured by the horizontal dipole coplanar transmitter-receiver coil pair. The display 20 may be configured to display both values simultaneously, or to display the values in alternating fashion for short time periods, and the values may also be stored in processor memory for future retrieval.

Thus, in one embodiment, the present invention provides a ground conductivity meter that can simultaneously determine an apparent conductivity for two different coil dipole orientations. In some applications of such embodiment, temperature compensation may not be required, or may be carried out using conventional analog techniques. Typically, however, the digital temperature compensation techniques described herein will be preferred as they are better suited for economically compensating for non-linear temperature drift.

In some situations, particularly where layering in the terrain is anticipated, the normal technique used in EM conductivity surveys is to take a series of conductivity measurements in an area using different coil spacings, as sensitivity can vary with depth differently for different coil spacings and accordingly the different conductivity readings for different coil spacings can collectively provide more information than a single reading. Such measurements can be time consuming as they traditionally are made one at a time, with coil spacing being varied between measurements requiring the measuring instrument to be adjusted to account for the changes spacing when determining conductivity.

Figure 7:
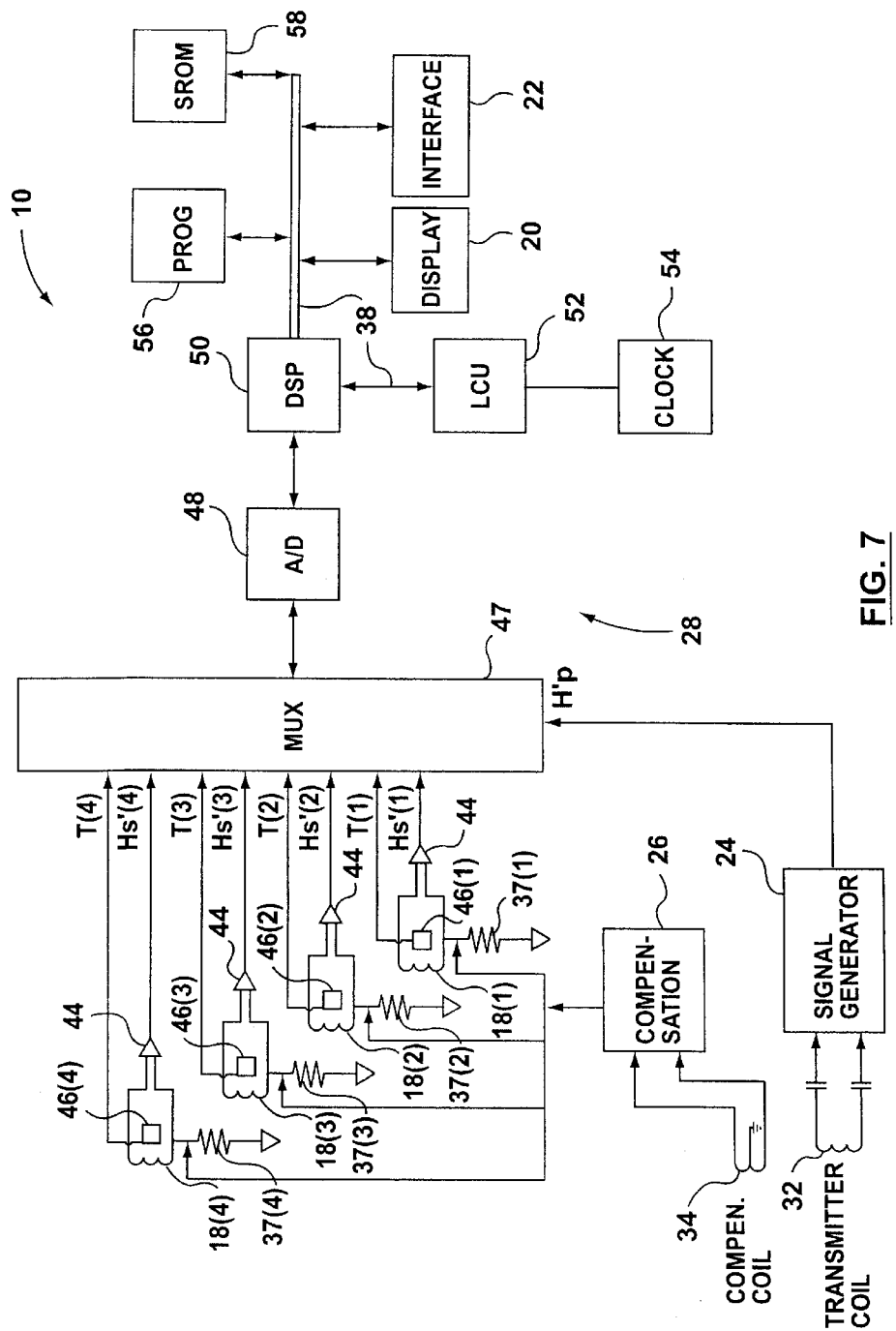
FIG. 7 is a block schematic diagram of the electronic aspects of still a further preferred form of the terrain conductivity meter.

With reference to FIG. 7, a further embodiment of a terrain conductivity meter, indicated generally by reference 90, is shown in block schematic form that has substantially the same configuration and method of operation as the meter 10 described above, except for the differences noted below. The terrain conductivity meter 90 includes four receiver coils 18(1)–18(4) each of which is spaced a different distance from the transmitter coil 32 such that four different conductivity readings, each representing a different transmitter-receiver coil spacing, can be taken at the same time. In one exemplary embodiment, the four receiver coils 18(1)–18(4) are respectively spaced along the boom 12 distances of 1 meter, 2 meters, 3 meters and 4 meters from the transmitter coil 32. The four receiver coils and the transmitter coil 32 are all coplanar with parallel dipoles. Each of the receiver coils is connected to the compensation network 26 through a respective compensation resistor 37(1)–37(4) so that the primary signal induced on each receiver coil directly by the transmitter coil can be effectively cancelled, with each receiver coil providing as an input to the multiplexer 47 a signal that is representative of the secondary current induced therein by the secondary field Hs. Preferably, the temperature of each receiver coil 18(1)–18(4) is monitored by a respective temperature sensing device 46(1)–46(4), with the real-time temperature of each of the receiver coils being inputted to the multiplexer 47. As with the terrain conductivity meter 10, the terrain conductivity meter 90 is subjected to a calibration procedure during which the temperature drift profile of each of the receiver coils 18(1)–18(4) is determined such that an error correction value for each of a number of discrete temperature values for each receiver coil can be stored in one or more look up tables in SROM 58.

During use, the terrain conductivity meter 90 is positioned over the terrain to be measured with the transmitter coil 32 and coplanar receiver coils 18(1)–18(4) either uniformly in a horizontal or vertical dipole orientation. The signal generator 24 energises the transmitter coil 32 to induce eddy currents in the terrain that in turn induce a secondary magnetic field that generates secondary current signals in the receiver coils 18(1) to 18(4). Primary currents are also induced in the coils 18(1)–18(4), however the compensation coil 34 and its corresponding compensation network 26 apply, through resistors 37(1)–37(4), deliver a cancellation signal to each of the receiver coils 18(1)–18(4), to effectively cancel the effect of the primary signal on the respective output signals from the receiver coils 18(1) to 18(4) (the compensation network 26 having a compensation resistor/capacitor pair 40, 42 associated with each receiver coil).

The multiplexer 47 thus receives as inputs: a) signal Hp' from the signal generator 24 that is representative of the primary field Hp generated by the transmitter coil 32; b) signals Hs'(1) to Hs'(4) that are representative of the signals induced by the secondary field Hs on each of the receiver coils 18(1) to 18(4); and c) temperature signals T(1)-T(4) indicating the current temperature of the respective coils 18(1)–18(2). Based on such inputs and pre-stored information (including the calibrated temperature correction values for each of the receiver coils and coil spacing information), the conductivity processor 28 is able to determine simultaneously, using the techniques discussed above, an apparent terrain conductivity as measured by for each of four transmitter-receiver coil spacings. The display 20 may be configured to display all four values simultaneously, or to display the values in alternating fashion for short time periods, and the values may also be stored in processor memory for future retrieval.

Thus, in one embodiment, the present invention provides a ground conductivity meter that can simultaneously determine an apparent conductivity for a number of different coil spacings. In some applications of such embodiment, temperature compensation may not be required, or may be carried out using conventional analog techniques. Typically, however, the digital temperature compensation techniques described herein will be preferred as they are better suited for economically compensating for non-linear temperature drift. Although the meter 90 has been illustrated as having four differently spaced coils, more or fewer coils could be used, and spacings other than those described above could be used with the spacing preferably being less then or equal to $50/\sqrt{fg}$ with f and g having the definition noted above.

Figure 8:
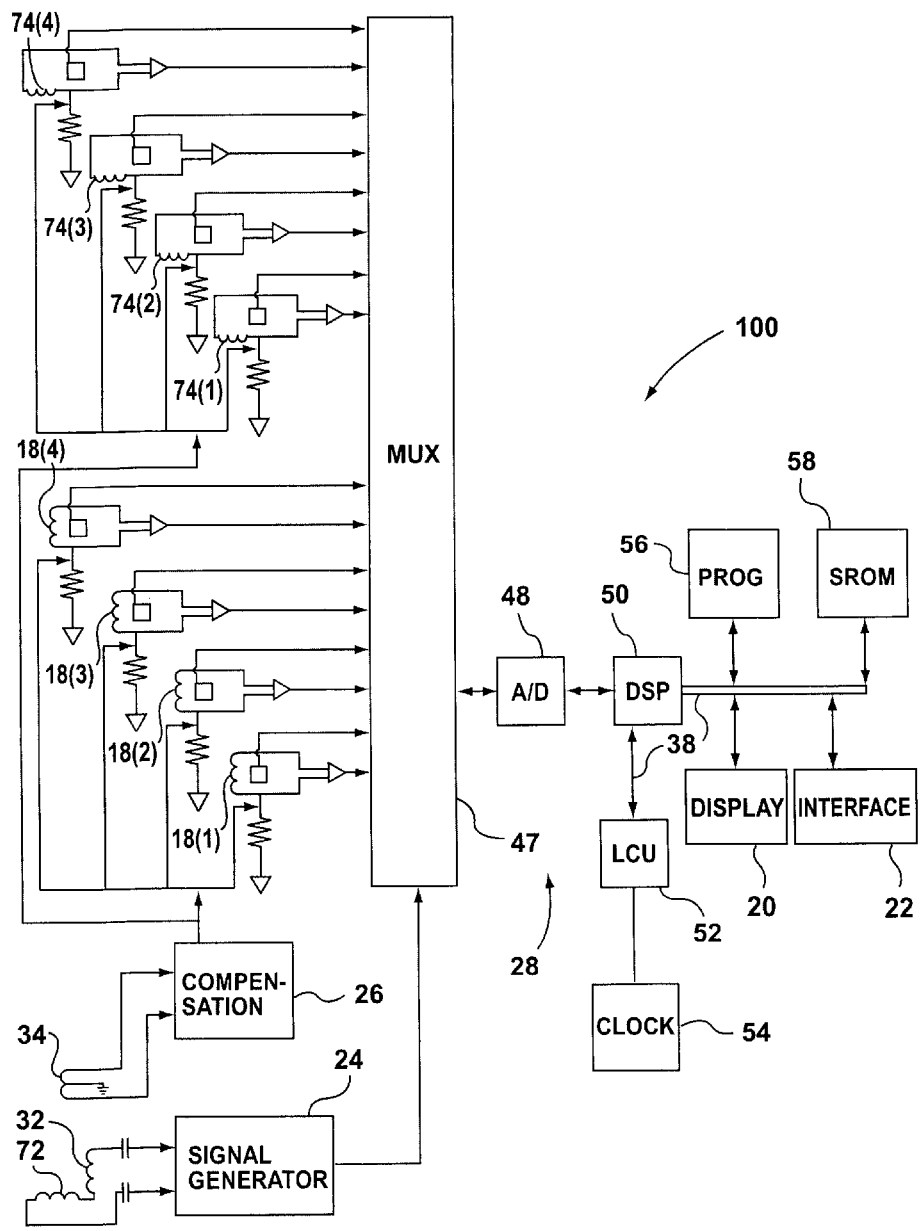
FIG. 8 is a block schematic diagram of the electronic aspects of yet another preferred form of the terrain conductivity meter.

Features of the perpendicular dual dipole terrain conductivity meter 70 and the multiple receiver coil single dipole meter 90 can be combined to provide a further terrain conductivity meter that can simultaneously measure the apparent conductivity in two perpendicular dipole directions for a plurality of transmitter coil spacings. In this regard, FIG. 8 shows a further terrain conductivity meter, indicated generally by 100, according to yet a further embodiment of the invention. The terrain conductivity meter 100 is substantially identical in configuration and operation to the meter 70 described above, however the meter 100 includes a further transmitter coil 72 that is connected in series with the transmitter coil 32, the dipoles of the transmitter coils 32 and 72 being perpendicular to each other and the coils preferably being would about a common coil former in the manner shown in FIG. 6A. The meter 100 also includes four additional receiver coils 74(1)–74(4), each of which is wound about a common coil former with a respective one of the receiver coils 18(1)–18(4) such that the dipoles of the receiver coils 74(1)–74(4) are perpendicular to the dipoles of the receiver coils 18(1)–18(4). Thus, coils 18(1) and 74(1) are each wrapped in perpendicular fashion around a common coil former in the manner shown in FIG. 6B, coils 18(2) and 74(2) are each wrapped in perpendicular fashion around further common coil former, and so on. Using such a configuration, the conductivity processor 28 can simultaneously receive secondary field signal inputs from four differently spaced vertically dipole oriented receiver coils and four differently spaced horizontally dipole oriented receiver coils, and use such inputs to calculate eight different temperature compensated apparent conductivity measurements.

Although the meters have been described above as having fixed coil spacings, it will be appreciated that meters having variable coil spacing and variable frequency settings could be constructed that use one or more of the features of the present invention. For example, in some embodiments, the transmitter and receiver coil(s) could be movable relative to each other and the conductivity processor, with wired or wireless communications being provided between the movable components. In some embodiments, primary signal cancellations could be performed digitally, however analog cancellation is generally preferred as it can provide a larger dynamic range and improved stability.

While the invention has been described with reference to the structures disclosed herein, it is not confined to the details set forth and this application is intended to cover such modifications or changes or may come within the purposes of the improvements or the scope of the following claims.

What is claimed is:

1. A conductivity meter for measuring conductivity of terrain, including:
   a first transmitter coil;
   a signal generator connected to the first transmitter coil to supply a time-varying current thereto for inducing eddy currents in the terrain;
   a first receiver coil horizontally spaced from the first transmitter coil;
   a temperature sensing device including a sensor positioned proximate to the first receiver coil for measuring a temperature of the first receiver coil; and
   a signal processor, including a memory storing a plurality of temperature dependent correction values, for isolating from a signal received by the first receiver coil a secondary signal representative of a secondary magnetic field generated in the terrain by the eddy currents, and determining an apparent terrain conductivity based on the isolated secondary signal and a selected temperature dependent correction value selected from the stored temperature dependent correction values according to a measured temperature received from the temperature sensing device.

2. The conductivity meter of claim 1 including a compensation coil located close to the first transmitter coil for receiving a signal representative of a primary magnetic field generated by the first transmitter coil, the signal processor including a compensation network for isolating the secondary signal by cancelling, based on the signal received by the compensation coil, a primary signal from the signal received by the first receiver coil.

3. The conductivity meter of claim 2 wherein the signal processor includes a conductivity processor that is configured to adjust the isolated secondary signal according to the selected temperature dependent correction value and then calculate the apparent conductivity as linearly related to the temperature adjusted isolated secondary signal.

4. The conductivity meter of claim 1 wherein the first receiver and transmitter coils are mounted at opposite ends of a portable generally horizontally extending boom and the signal processing means is supported by the boom intermediate its ends.

5. The conductivity meter of claim 1 wherein the time-varying current is an alternating current and the spacing s of the first transmitter and first receiver coils in meters and the frequency f of the alternating current in Hertz are selected so that s does not substantially exceed about $50/\sqrt{fg}$ where g is the maximum terrain conductivity to be measured in Siemens/meter.

6. The conductivity meter of claim 1 wherein the signal processor includes an analog to digital converter for sampling the isolated secondary signal to determine a magnitude thereof, the apparent conductivity being proportional to the magnitude as corrected according to the selected temperature dependent correction value.

7. The conductivity meter of claim 1 wherein the signal processor includes digital display means for displaying the apparent conductivity, and digital memory means for storing a plurality of successively determined apparent conductivity values for future retrieval.

8. The conductivity meter of claim 1 including a second transmitter coil located proximate the first transmitter coil and connected to receive the time-varying current from the signal generator for inducing further eddy currents in the terrain, and a second receiver coil horizontally spaced from the second transmitter coil in the same direction and substantially the same distance that the first receiver coil is spaced from the first transmitter coil, the first receiver and first transmitter coils being coplanar and having parallel dipoles, the second transmitter and receiver coils being coplanar and having parallel dipoles that are perpendicular to the dipoles of the first receiver and transmitter coils, the signal processor being configured to isolate from a signal received by the second receiver coil a further secondary signal representative of a secondary magnetic field generated in the terrain by the further eddy currents, and determine a second apparent terrain conductivity based on the further isolated secondary signal and a selected temperature dependent correction value selected from the stored temperature dependent correction values according to a measured temperature received from the temperature sensing device.

9. The conductivity meter of claim 8 wherein the first and second transmitter coils are connected in series with the signal generator.

10. The conductivity meter of claim 8 wherein the temperature sensing device includes sensors for sensing a separate temperature value for each of the first and second receiver coils and the signal processor determines the apparent terrain conductivity value and the second apparent terrain conductivity value based on temperature dependent correction values uniquely selected for the secondary signals derived from each of the first and second receiver coils.

11. The conductivity meter of claim 8 wherein at least one of the first and second transmitter coils and the first and second receiver coils are wound in perpendicular plans about a common coil former and have a common electrical center.

12. The conductivity meter of claim 8 wherein the first and second transmitter coils are wound in perpendicular plans about a common coil former having three pairs of opposite sides, with the first transmitter coil wound about two pairs of opposite sides of the coil former and the second transmitter coil wound about two pairs of opposite sides of the coil former, the first and second transmitter coils each passing over a common pair of opposite sides of the coil former, and the first and second receiver coils are wound in perpendicular plans about a further common coil former having three pairs of opposite sides, with the first receiver coil wound about two pairs of opposite sides of the further coil former and the second receiver coil wound about two pairs of opposite sides of the further coil former, the first and second receiver coils each passing over a common pair of opposite sides of the further coil former.

13. The conductivity meter of claim 8 including at least two receiver coils associated with and each horizontally spaced different distances from the first transmitter coil and that are coplanar with and have dipoles parallel to dipoles of the first transmitter coil, and at least two receiver coils that are associated with and each horizontally spaced different distances from the second transmitter coil in the same direction and the same relative distances that the two receiver coils associated with the first transmitter coil are spaced from the first transmitter coil, the receiver coils associated with the second transmitter coil being coplanar with and having dipoles parallel to dipoles of the second transmitter coil, the signal processor being configured to isolate, for each receiver coil, a secondary signal representative of a secondary magnetic field generated in the terrain and received by the receiver coil, and determine, for each isolated secondary signal an apparent conductivity based on the isolated secondary signal and a selected temperature dependent correction value selected from the stored temperature dependent correction values according to a measured temperature received from the temperature sensing device.

14. The conductivity meter of claim 1 including a plurality of receiver coils horizontally spaced from the transmitter coil different distances, the signal processor being configured to isolate, for each receiver coil, a secondary signal representative of a secondary magnetic field generated in the terrain and received by the receiver coil, and determine, for each isolated secondary signal an apparent conductivity based on the isolated secondary signal and a selected temperature dependent correction value selected from the stored temperature dependent correction values according to a measured temperature received from the temperature sensing device.

15. The conductivity meter of claim 14 wherein the temperature sensing device includes a plurality of sensors, each sensor associated with one of the receiver coils, and the temperature correction value is uniquely selected for determining each apparent conductivity in dependence on the temperature of the receiver coil from which the isolated secondary signal is derived.

16. A method of measuring terrain conductivity, comprising:
   generating an AC signal and applying it to a transmitter coil positioned over the terrain whose conductivity is being measured;
   receiving signals from the transmitter coil by means of a receiver coil horizontally spaced from the transmitter coil;
   isolating from the received signals a signal representative of a secondary magnetic field generated in the terrain by eddy currents resulting from a primary magnetic field generated by the transmitter coil;
   measuring a temperature of the receiver coil and selecting based thereon a correction value from a plurality of pre-determined temperature dependent correction values; and
   calculating an apparent conductivity according to the selected correction value a magnitude of the isolated signal.

17. A conductivity meter for measuring conductivity of terrain, including:
   a transmitter coil;
   a signal generator connected to the first transmitter coil to supply a time-varying current thereto for inducing current in the terrain;
   a plurality of receiver coils horizontally spaced from the transmitter coil different distances; and
   a signal processor configured to isolate, for each receiver coil, an associated secondary signal representative of a secondary magnetic field generated in the terrain by the induced current and received by the receiver coil, and determine, for each isolated secondary signal an apparent conductivity based on the isolated secondary signal.

18. The conductivity meter of claim 17 wherein the signal processor includes multiplexing and sampling means connected to a digital signal processor, the multiplexing and sampling means being configured to receive, multiplex and digitize the isolated secondary signals associated with each of the receiver coils for input to the digital signal processor, the digital signal processor being configured to calculate and output the apparent conductivity for each isolated secondary signal in linear proportion to an associated component of the multiplexed and digitized isolated secondary signals.

19. A conductivity meter for measuring conductivity of terrain, including:
   a first transmitter coil and a second transmitter coil located proximate to each other and having perpendicular dipoles;
   a signal generator connected to the first transmitter coil and the second transmitter coil to supply a time-varying current thereto for generating perpendicular primary magnetic fields inducing currents in the terrain;
   a first receiver coil coplanar with and horizontally spaced from the first transmitter coil;

a second receiver coil coplanar with and horizontally spaced from the second transmitter coil in the same direction and substantially the same distance that the first receiver coil is spaced from the first transmitter coil, the first transmitter and first receiver coils having parallel dipoles and the second transmitter and second receiver coils having parallel dipoles; and a signal processor configured to isolate, for the first receiver coil, a secondary signal representative of a secondary magnetic field generated in the terrain by the current induced therein by a primary field generated by the first transmitter coil, and to isolate for the second receiver coil, a secondary signal representative of a secondary magnetic field generated in the terrain by the current induced therein by a primary field generated by the second transmitter coil, the signal processor being configured to determine, for each isolated secondary signal an apparent conductivity based on the isolated secondary signal.

20. The conductivity meter of claim 19 wherein the first transmitter and second transmitter coils are wound in perpendicular plans about a common coil former and have a common electrical center and the first receiver and second receiver coils are wound in perpendicular plans about a further common coil former and have a common electrical center.

21. The conductivity meter of claim 19 wherein the first and second transmitter coils are connected in series with the signal generator.

22. A conductivity meter for measuring conductivity of terrain, including:

a first transmitter coil;

a signal generator connected to the first transmitter coil to supply a time-varying current thereto for inducing eddy currents in the terrain;

a second transmitter coil located proximate the first transmitter coil and connected to receive the time-varying current from the signal generator for inducing further eddy currents in the terrain a first receiver coil horizontally spaced from the first transmitter coil, the first receiver and first transmitter coils being coplanar and having parallel dipoles;

a second receiver coil horizontally spaced from the second transmitter coil in the same direction and substantially the same distance that the first receiver coil is spaced from the first transmitter coil, the second transmitter and second receiver coils being coplanar and having parallel dipoles that are perpendicular to the dipoles of the first receiver and first transmitter coils, a temperature sensing device for measuring a temperature; and a signal processor, including a memory storing a plurality of temperature dependent correction values, for (i) isolating from a signal received by the first receiver coil a secondary signal representative of a secondary magnetic field generated in the terrain by the eddy currents, and determining an apparent terrain conductivity based on the isolated secondary signal and a selected temperature dependent correction value selected from the stored temperature dependent correction values according to a measured temperature received from the temperature sensing device, and (ii) isolating from a signal received by the second receiver coil a further secondary signal representative of a secondary magnetic field generated in the terrain by the further eddy currents, and determining a second apparent terrain conductivity based on the further isolated secondary signal and a selected temperature dependent correction value selected from the stored temperature dependent correction values according to a measured temperature received from the temperature sensing device.

23. A conductivity meter for measuring conductivity of terrain, including:

a first transmitter coil;

a signal generator connected to the first transmitter coil to supply a time-varying current thereto for inducing eddy currents in the terrain;

a plurality of receiver coils horizontally spaced from the transmitter coil different distances;

a temperature sensing device for measuring a temperature; and a signal processor, including a memory storing a plurality of temperature dependent correction values, for isolating, for each receiver coil, a secondary signal representative of a secondary magnetic field generated in the terrain and received by the receiver coil, and determining, for each isolated secondary signal an apparent conductivity based on the isolated secondary signal and a selected temperature dependent correction value selected from the stored temperature dependent correction values according to a measured temperature received from the temperature sensing device.

* * * * *